(12) United States Patent
Lacroix

(10) Patent No.: US 9,309,905 B2
(45) Date of Patent: Apr. 12, 2016

(54) CLAMPING ELEMENT AND METHOD FOR USE

(71) Applicant: GM GLOBAL TECHNOLOGY OPERATIONS LLC, Detroit, MI (US)

(72) Inventor: Joachim Lacroix, Flonheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 536 days.

(21) Appl. No.: 13/653,599

(22) Filed: Oct. 17, 2012

(65) Prior Publication Data

US 2013/0097838 A1    Apr. 25, 2013

(30) Foreign Application Priority Data

Oct. 19, 2011    (DE) .......................... 10 2011 116 357

(51) Int. Cl.
| | | |
|---|---|---|
| *B60R 13/08* | (2006.01) | |
| *F16B 2/24* | (2006.01) | |
| *B23P 11/00* | (2006.01) | |
| *B23B 3/06* | (2006.01) | |
| *B60Q 1/04* | (2006.01) | |

(52) U.S. Cl.
CPC . *F16B 2/245* (2013.01); *B23B 3/06* (2013.01); *B23P 11/00* (2013.01); *B60Q 1/0441* (2013.01); *B60R 13/0838* (2013.01); *B60R 13/0876* (2013.01); *B60R 2013/0807* (2013.01); *Y10T 24/44641* (2015.01); *Y10T 29/49824* (2015.01); *Y10T 29/49959* (2015.01); *Y10T 428/24008* (2015.01)

(58) Field of Classification Search
CPC .............. F16B 2/245; Y10T 29/49824; Y10T 29/49959; Y10T 428/24008
USPC .......................................................... 296/39.3
See application file for complete search history.

(56) References Cited

U.S. PATENT DOCUMENTS

| | | | |
|---|---|---|---|
| 5,080,949 A | 1/1992 | Nawrocki et al. | |
| 5,511,919 A * | 4/1996 | Scalise ........................... | 411/555 |
| 7,316,448 B2 | 1/2008 | Koyama et al. | |
| 2003/0146639 A1* | 8/2003 | Donick et al. ............... | 296/39.3 |
| 2007/0284457 A1* | 12/2007 | Shank et al. .................. | 239/135 |
| 2011/0108343 A1 | 5/2011 | Mizuta | |
| 2011/0318526 A1* | 12/2011 | Krus ............................... | 428/99 |

FOREIGN PATENT DOCUMENTS

| | | |
|---|---|---|
| CN | 2911282 Y | 6/2007 |
| CN | 201786833 U | 4/2011 |

(Continued)

OTHER PUBLICATIONS

German Patent Office, German Search Report for Application No. 102011116357.7, dated May 10, 2012.

*Primary Examiner* — Pinel Romain
(74) *Attorney, Agent, or Firm* — Ingrassia Fisher & Lorenz PC

(57) ABSTRACT

A clamping element, a fastening arrangement with clamping element, and a method for use of the clamping element are provided. In one example, the clamping element has a first leg and a second leg. The first and the second leg are arranged lying opposite one another. The first and the second leg are connected mechanically via a base region. The base region braces in the first leg in a spring-elastic manner with respect to the second leg on the parts arranged and clamped between the legs.

3 Claims, 6 Drawing Sheets

(56) References Cited

FOREIGN PATENT DOCUMENTS

| DE | 1120907 B | 12/1961 |
| DE | 3834054 A1 | 4/1990 |
| DE | 19718365 A1 | 11/1998 |
| DE | 69409783 T2 | 3/1999 |
| DE | 102004030622 A1 | 1/2006 |
| DE | WO 2010102656 A1 * | 9/2010 | .......... B60R 13/0876 |
| GB | 2036660 A | 7/1980 |
| GB | 2455740 A | 6/2009 |

* cited by examiner

CLAMPING ELEMENT AND METHOD FOR USE

CROSS-REFERENCE TO RELATED APPLICATION

This application claims priority to German Patent Application No. 10 2011 116 357.7, filed Oct. 19, 2011, which is incorporated herein by reference in its entirety.

TECHNICAL FIELD

This application pertains to a clamping element and a fastening arrangement with clamping element and a method for use of the clamping element. In one example, the clamping element has a first leg and a second leg. The first and the second leg are arranged lying opposite one another. The first and the second leg are connected mechanically via a base region.

BACKGROUND

From the publication DE 197 18 365 A1 a fastening device for a vehicle lamp or a headlamp a clamping element is disclosed. In this clamping element, the connection in the base region is achieved in that a screw is introduced into the through-opening of the two legs and the two legs are pressed onto one another with a nut, wherein a connecting piece between the upper leg and the lower leg holds the two legs in position with respect to one another. Such a clamping element with pointed claws on the legs is not able to press onto one another parts arranged between the legs without the screw connection which is provided for the two legs.

A further disadvantage results through the number of necessary machine elements which are to be produced in close tolerance with respect to one another, and through the high mounting effort in the assembly of the known fastening device.

Accordingly, it is desirable to provide an improved clamping element, which is able to be mounted with few hand movements and is not able to be dismantled without an auxiliary tool. In addition, other objects, desirable features and characteristics will become apparent from the subsequent summary and detailed description, and the appended claims, taken in conjunction with the accompanying drawings and this background.

SUMMARY

According to various aspects of the present disclosure, a clamping element is described. Another of various aspects of the present disclosure relates to methods for use of the clamping element. Another of various aspects discloses a fastening arrangement with the clamping element and another of various aspects of the present disclosure relates to a method using the clamping element.

In one of various aspects of the present disclosure, the clamping element has a first leg and a second leg. The first and the second leg are arranged lying opposite one another. The first and the second leg are connected mechanically via a base region. The base region braces in a spring-elastic manner the first leg with respect to the second leg on arranging of parts between the legs with clawing together of the legs on the parts.

Such a clamping element has the advantage that on the one hand it is able to be produced at a more favorable cost than a clamping element with a screw connection, and on the other hand the mounting effort for such a clamping element is distinctly reduced compared with the known clamping element with a screw connection. In addition, the advantage results that the parts which are to be pressed onto one another can have different materials, such as a metal part and a plastic part.

In an exemplary embodiment of the present disclosure, inwardly-directed pointed claws project out from the legs in the direction of the parts which are to be arranged. This has the advantage that with the aid of the claws a so-called clawing together can take place, by notches occurring in the surfaces of the parts which are to be connected owing to the contact pressure which acts over the base region onto the legs, and hence also connect the two parts in a form-fitting manner and the clamping element with one another.

Moreover, provision is made that the claws are arranged in pairs on left-side and right-side edges of the legs. By the arrangement in pairs, the contact pressure is distributed uniformly on respectively at least two claws of the one leg and on at least two further claws of the other leg, in order to achieve the above-mentioned notches.

Moreover, provision is made that the pointed claws have a claw base which is aligned opposed to a claw tip, wherein in a mounting direction of the clamping element the claw base is positioned in front of the claw tip. This has the advantage that in the mounting direction the claw tip can yield in a spring-elastic manner and a distinct clawing together occurs when the clamping element is to be dismantled.

Basically, since the pointed claws have formed a notch or respectively an impression in the parts which are to be pressed together, a dismantling is only possible with a spreading tool. A spreading tool requires a modification of the clamping element such that at the free ends of the legs edge bends are provided, behind which a spreading tool can engage and can lift the two legs with their pointed claws out from the notches.

In order to ensure the contact force of the legs, the clamping element has a spring steel alloy.

In addition, the contact force of the legs can be set differently, by one of the legs being longer than the other, wherein the contact force of the pointed claws is less on the longer leg than the contact force which can be applied with claws on the shorter leg.

In another of various aspects of the present disclosure, provision is made to use the clamping element which has been described above for the mechanical pressing onto one another of parts made of different materials. Here, the first part can be an edge region of a heat deflector plate, and the second part can form an edge region, congruent thereto, of a plastic structure, wherein the edge regions are pressed onto one another by means of such a clamping element and are held in this position via the clawing together by the clamping element.

Another of various aspects relates to a fastening arrangement of a heat deflector plate on a plastic structure. For this, the fastening arrangement has an edge region of the plastic structure, which is exposed to a thermal radiation and a thermal convection of a heat source.

In vehicle construction, such heat sources are situated in the engine region of the vehicle, wherein a turbocharger of a modern internal combustion engine constitutes an intensive heat source. Through the increasing compactness of the engine compartment of a motor vehicle, such an intensive heat source can lead to the fusing of adjacent plastic structures. Therefore, the plastic structure in the endangered regions is protected by a heat deflector plate with a sound- and heat insulation lamination. In order to fix the heat deflector plate on the plastic structure, an edge region of the heat deflector plate which is congruent to an edge region of the plastic structure has at least one of the clamping elements which were described above. These clamping elements are constructed in order to press onto one another the edge regions of the plastic structure and heat deflector plate with the sound- and heat insulation lamination arranged therebetween, and to fix them into a predetermined position.

For this, the claw tips of the clamping elements have notches both in the edge region of the heat deflector plate and also in the edge region of the plastic structure, such that the clamping elements are only able to be dismantled by means of a spreading tool.

Furthermore, provision is made that the plastic structure has a lower edge region which is more intensively exposed to the thermal radiation and the thermal convection of the heat source than an upper edge region, so that in the lower edge region heat-resistant spring steel clamping elements are provided for fixing the lower edge region, whereas on the upper edge region plastic clamping elements are sufficient for fixing the heat deflector plate on the plastic structure.

In another exemplary embodiment of the present disclosure, provision is made that the plastic structure has a service panel on an upper crossmember of a vehicle body beneath a windshield and above a turbocharger of an internal combustion engine. Here, the turbocharger forms the heat source which may stress the lower edge of the plastic structure than the upper edge, so that the lower edge of the heat deflector plate is fixed onto the lower edge of the plastic structure or respectively of the service panel with the aid of the steel spring clamps described above.

In another of various aspects of the present disclosure, a method is described using the clamping element for fastening a heat plate on a plastic structure. For this, firstly heat-resistant U-shaped clamping elements are provided with inwardly-directed pointed claws on legs of each clamping element. Subsequently, an edge region of the heat deflector plate with applied sound- and heat insulating lamination is aligned to an edge region of the plastic structure congruent thereto.

Subsequently, the edge regions are pressed together with compressing of the sound- and heat insulating lamination, and the U-shaped clamping elements are pushed on. In so doing, an impressing of notches takes place into the edge region of the heat deflector plate and into the edge region of the plastic structure by means of the legs of the clamping elements with inwardly-directed pointed claws. This impressing of the pointed claws into the parts which are to be connected in the form of a heat deflector plate and a plastic structure has the advantage that a form fit can take place with the aid of the clamping elements. This form fit is, however, only able to be released by means of a spreading tool and forms a reliable fastening of the heat deflector plate on the plastic structure in the form of a service panel.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
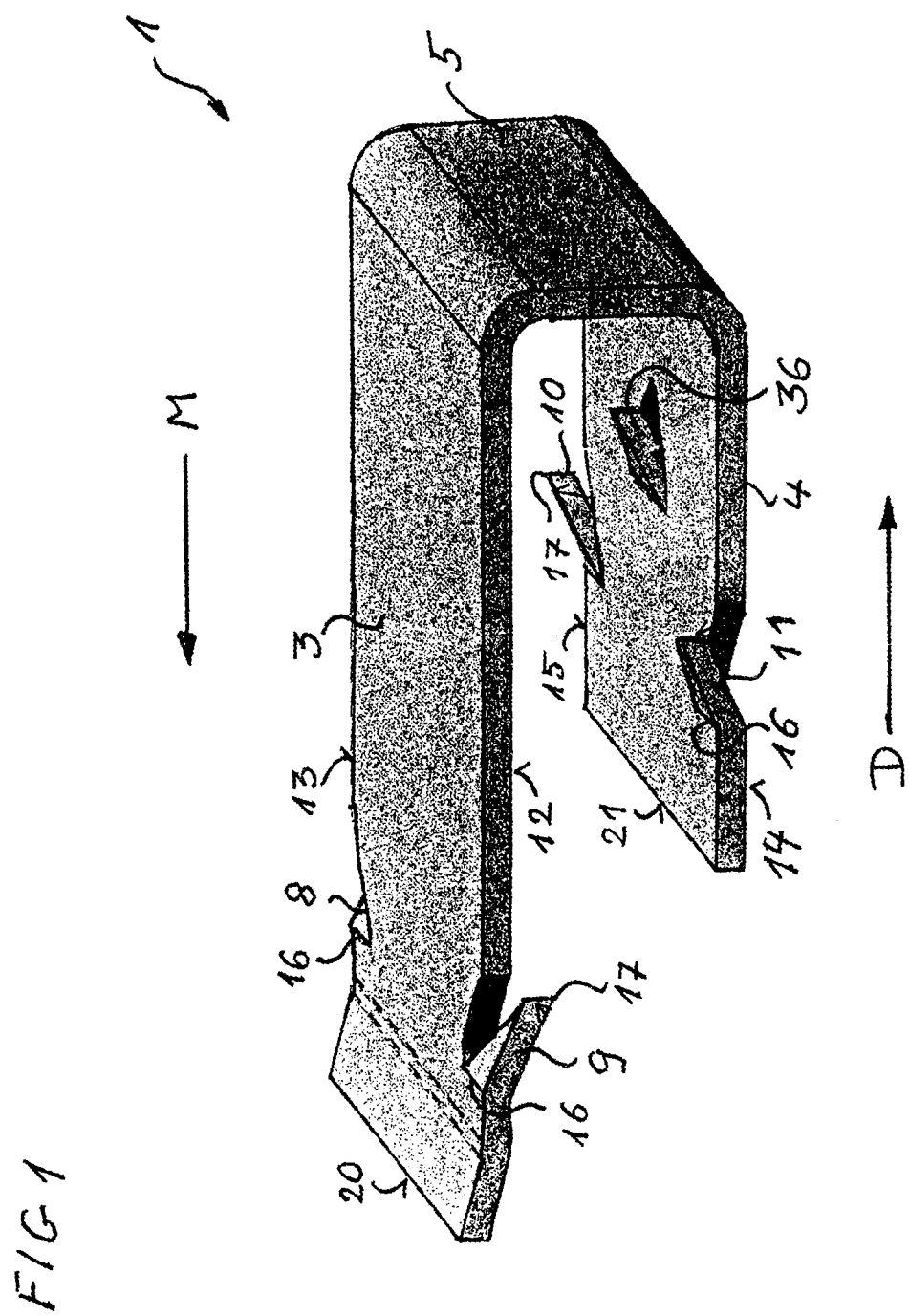
FIG. 1 shows a diagrammatic perspective view of a clamping element according to an exemplary embodiment of the present disclosure.

FIG. 1 shows a diagrammatic perspective view of a clamping element 1 according to an exemplary embodiment of the present disclosure. The clamping element 1 is in one piece and has a first leg 3 and a second leg 4 lying opposite. The first leg 3 is connected with the second leg 4 via a base region 5. In this embodiment, the first leg 3 is longer than the second leg 4. The first leg 3 has a pointed claw 8 on its right-side edge 13 and a second pointed claw 9 on its left-side edge 12. The claws 8 and 9 are arranged in pairs lying opposite one another on the two edges 12 and 13 of the leg 3.

The leg 3 is bent up slightly in the mounting direction M in front of the claws 8 and 9, which are arranged in pairs, so that a free end 20 can be pushed easily onto parts which are to be pressed together. Each of the claws 8 and 9 has a claw base 16 and a claw tip 17, wherein in the mounting direction M the claw base 16 is positioned in front of the claw tip 17, so that the clamping element 1 can be pushed on without great resistance onto edge regions of the parts which are to be clamped and clawed together.

Through the greater length of the first leg 3, the claws 8 and 9 exert less contact pressure onto the parts than claws 10 and 11 of the second leg 4, which are in turn arranged in pairs on a right-side edge 15 and a left-side edge 14. In addition, this second leg 4 has a somewhat set back central pointed claw 36, which is intended to further intensify the form fit of the second leg 4.

As during the pushing on in the mounting direction M the first free end 20 of the first leg 3 first meets the parts which are to be clamped and clawed together, it is advantageous that this first leg 3 is longer and consequently can be connected more easily in a spring-elastic manner than the second leg, which ensures a final fixing of the arrangement with its three pointed claws 10, 11 and 36. In addition, the pressure force onto the shorter second leg 4 is greater than onto the first leg 3, generally as the second leg 3 is also to impress a greater number of pointed claws into a material.

The clamping element 1 shown in FIG. 1 is punched from a spring steel sheet, wherein firstly only grazing takes place with simultaneous punching out of the entire five provided claws 8 to 11 and 36. Subsequently, the legs 3 and 4 are bent to one another such that the base region 5 is formed and the claw tips 17 are aligned inwards to the parts which are to be clamped. This has not only the advantage of the reliable notching of the pointed claws 8 to 11 and 36 into the parts which are to be connected, but also has the advantage that the clamping element 1 can be mounted more easily, avoiding the risks of injury, because no claws project outwards.

Figure 2:
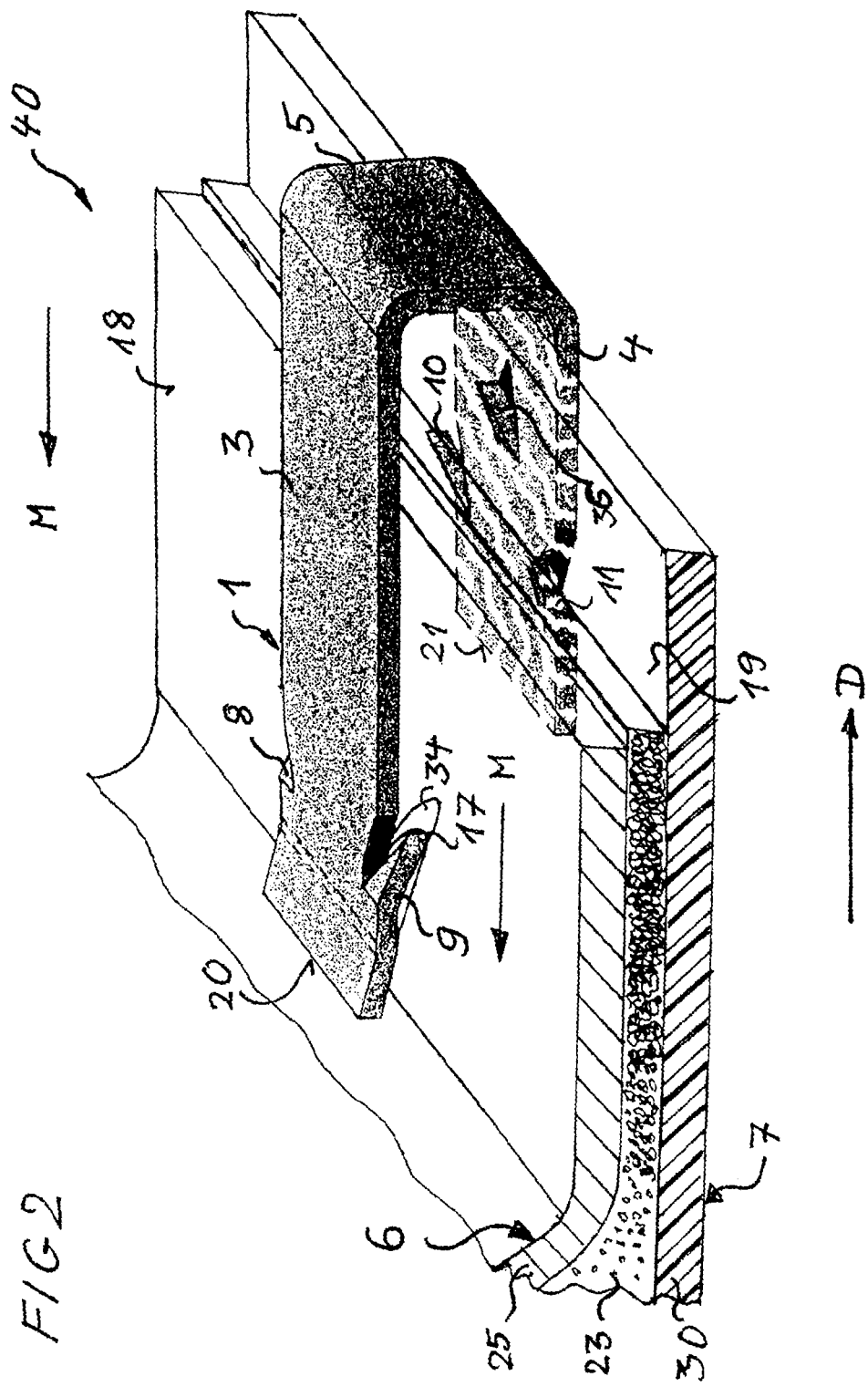
FIG. 2 shows a diagrammatic perspective view of a fastening arrangement with the clamping element according to FIG. 1.

FIG. 2 shows a diagrammatic perspective view of a fastening arrangement 40 with the clamping element 1 according to FIG. 1. In this exemplary embodiment, an edge region 18 of a heat deflector plate 25 is pressed onto an edge region 19 of a plastic structure 30 by the clamping element 1 which is shown according to one exemplary embodiment of the present disclosure. The heat deflector plate 25 is provided with a sound- and heat insulation lamination 23, which on the one hand is already less strongly pronounced in the edge regions 18 and 19, and on the other hand can be highly compressed by the clamping element 1.

On pushing the clamping element 1 onto the edge regions 18 and 19, the claw tips 17 claw into the respective material of the edge regions 18 and 19 such that notches 34 arise, which fix the clamping element in the pushed-in position, so that a form fit occurs between the parts 6 and 7 and the clamping element 1, which is not able to be released without auxiliary tools. At least a forcible pulling down of the clamping element 1 in the dismantling direction D would cause distinct damage to the surfaces of the edge regions 18 and 19.

Figure 3:
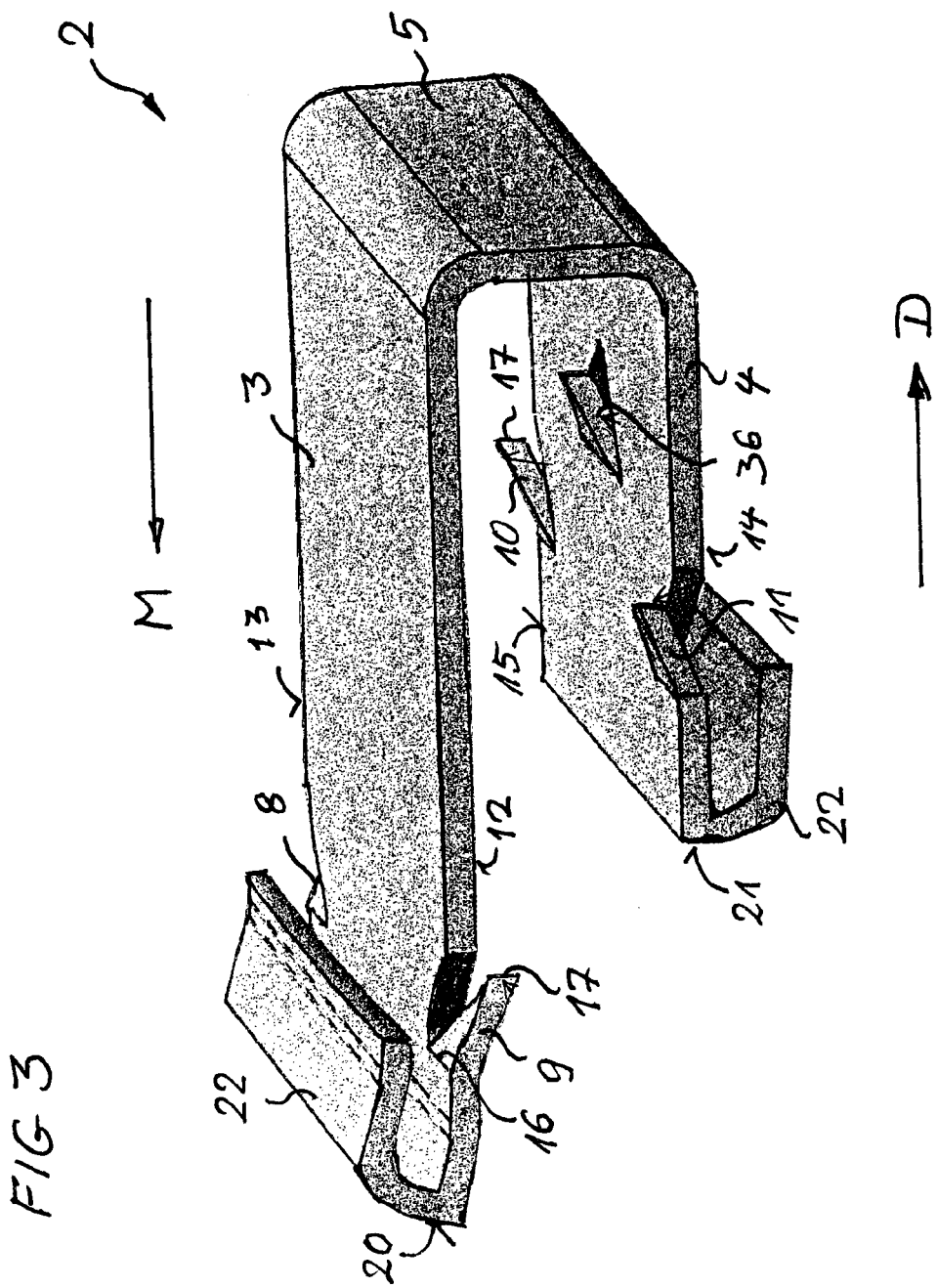
FIG. 3 shows a diagrammatic perspective view of a clamping element according to another exemplary embodiment of the present disclosure.

FIG. 3 shows a diagrammatic perspective view of a clamping element 2 according to another exemplary embodiment of the present disclosure. Components with identical functions as in the preceding figures are marked with identical reference numbers and are not the subject of extra discussion.

The difference from the previous exemplary embodiment comprises substantially that at the free ends 20 and 21 of the first leg 3 or respectively of the second leg 4, edge bends 22 are now provided, which are configured such that after the pushing-in of legs of a spreading tool under the edge bends 22, the legs 3 and 4 in a mounted version firstly against the elastic force of the first and second legs 3 and 4 and of the base region 5, the legs 3 and 4 are spread apart from one another, so that a dismantling can take place in arrow direction D of the clamping element 1 without damage to the edge regions of the parts.

Figure 4:
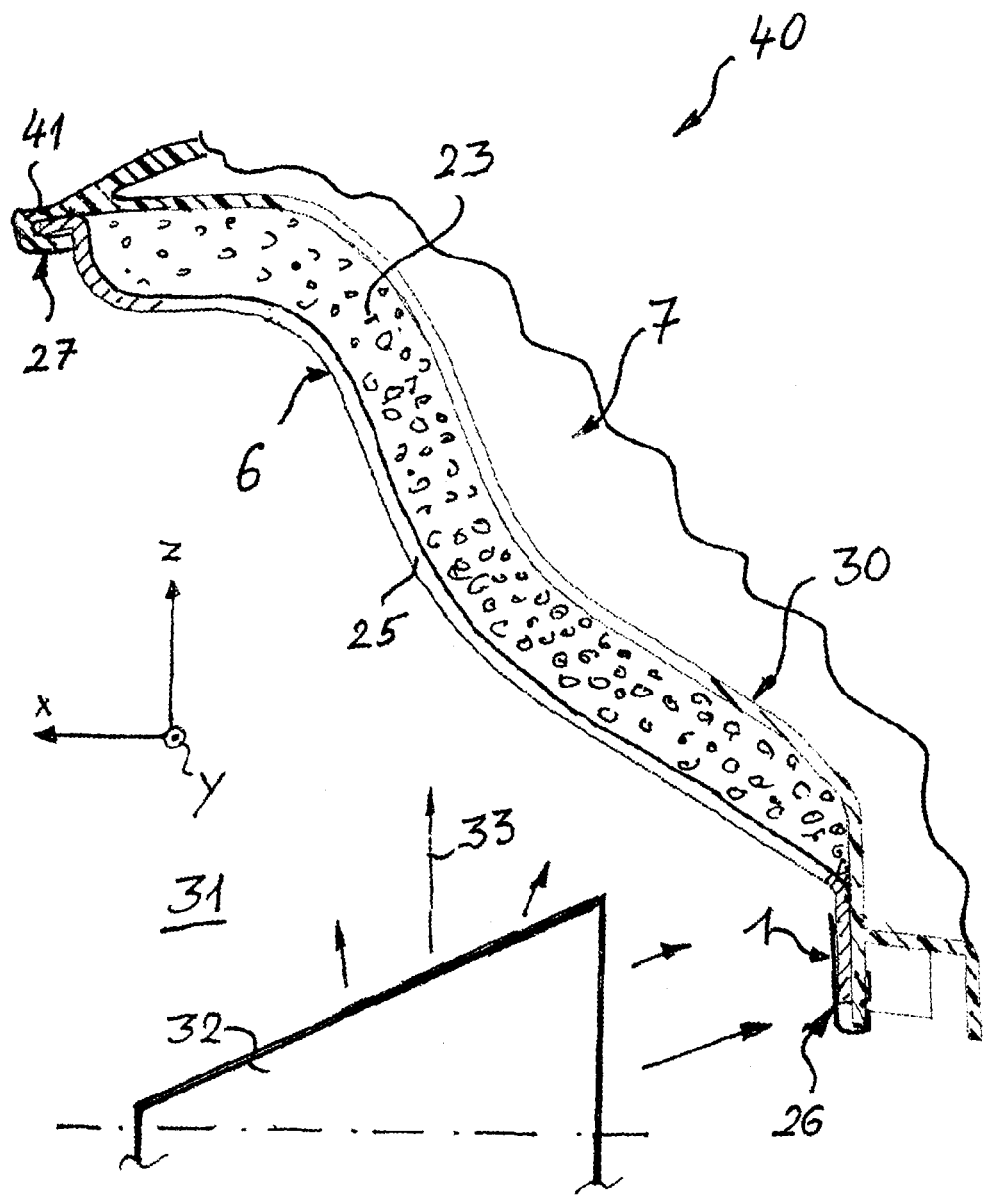
FIG. 4 shows a diagrammatic cross-section through a fastening arrangement according to FIG. 2.

FIG. 4 shows a diagrammatic cross-section through a fastening arrangement 40 according to FIG. 2 relating to a heat source 33. In this fastening arrangement of FIG. 2, the concern is that a service panel in the form of the plastic structure 30 is to be protected by a heat deflector plate 25. As in this region of the service panel firstly the lower edge region 26 may be more stressed and heated by a heat source 33, such as for example a turbocharger 32, than an upper region 27, pre-formed plastic clamps may melt in this lower edge region. Therefore, the lower edge region 26 of the plastic structure 30, which lies in the immediate vicinity of the heat source 33 of the turbocharger 32, may be damaged.

Whereas an upper edge region 27 of the heat deflector plate 25 can still be held with plastic clamping elements 41, heat-resistant clamping elements 1 are provided for the lower edge region. As in this exemplary embodiment a generally strong or respectively thick sound- and heat insulation layer 23 is provided, the latter is not only tapered towards the clamping edges, but is for the most part also omitted, so that metal is connected directly on plastic with the aid of the clamping element 1 in a form-fitting and force-fitting manner.

In order to provide the fastening arrangement 40 for a motor vehicle in the engine compartment, for orientation a coordinate system with the axes x, z and y is shown in FIG. 4, wherein z is the vertical axis, x shows the direction of travel and y represents the direction transversely to the direction of travel.

Figure 5:
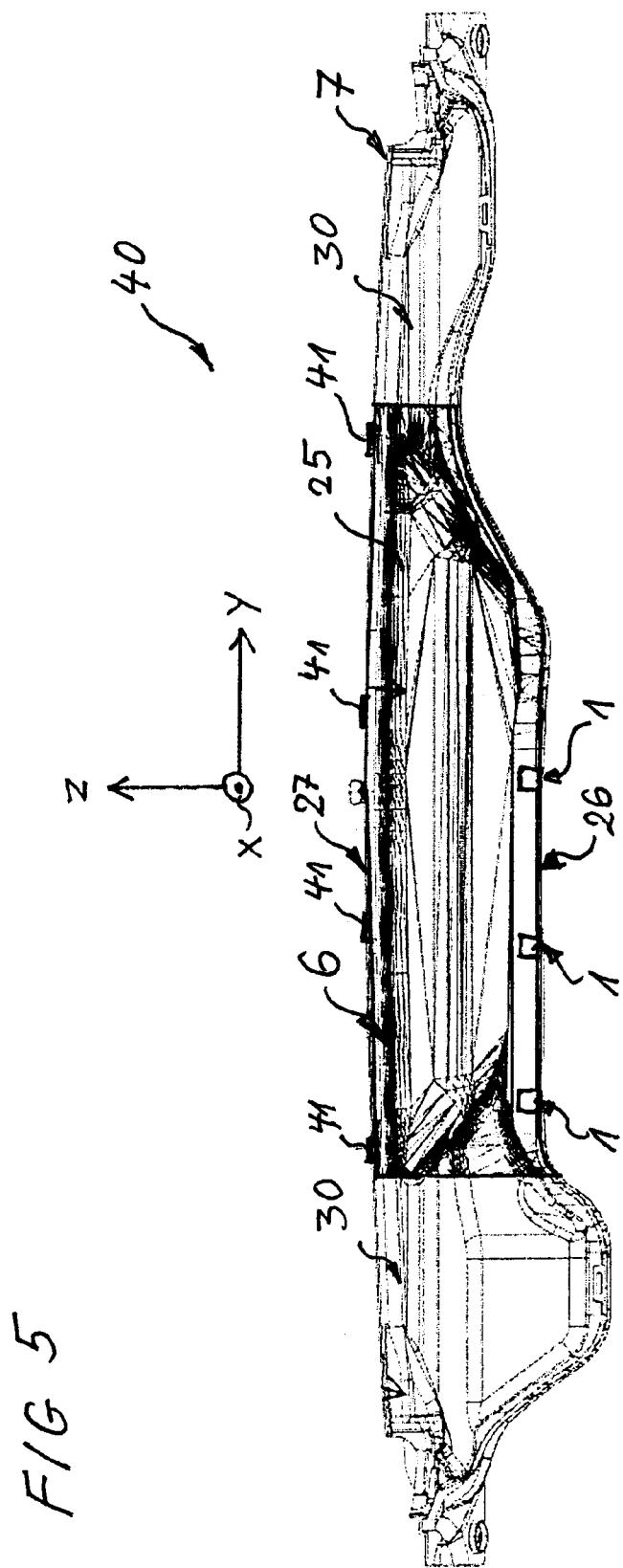
FIG. 5 shows a diagrammatic front view of the fastening arrangement according to FIG. 2.
Figure 6:
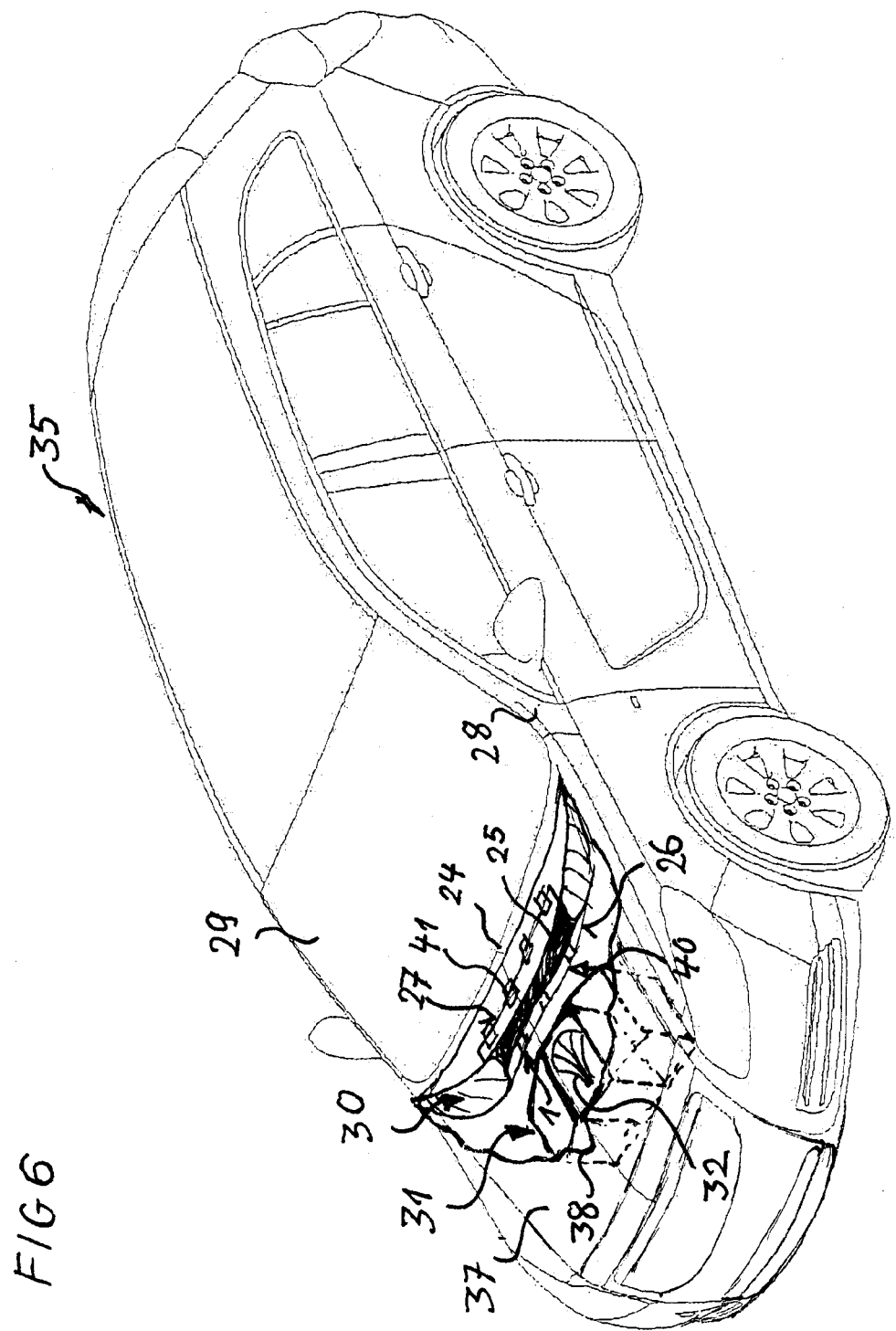
FIG. 6 shows a diagrammatic perspective view of a motor vehicle with a fastening arrangement according to FIG. 2.

FIG. 5 shows a diagrammatic front view of the fastening arrangement 40 according to FIG. 2. For this, FIG. 5 shows a plastic structure 30 of a service panel, which is usually arranged in a motor vehicle beneath a windshield 29 on an upper crossmember 24 of the vehicle body 28 as shown in FIG. 6. As FIG. 5 shows, this service panel is not protected over the entire vehicle width, but rather only a region which is arranged in the immediate vicinity of the turbocharger. This region, which is protected by a heat deflector plate 25, is edged here in black, wherein the edge region 26 is a lower edge region on which the heat-resistant clamping elements 1, which have already been discussed above, are mounted in three positions.

In the upper edge region 27, plastic clamping elements 41 can be used, because it does not become as hot in the upper region as in the lower edge region 26.

FIG. 6 shows a diagrammatic perspective view of a motor vehicle 35 with a fastening arrangement 40 according to FIG. 2. For this, an engine hood 37 is shown partially broken open along the break line 38. An internal combustion engine 31 is drawn as a block and has a turbocharger 32, which represents a considerable heat source which acts on a service panel in the form of a plastic structure 30 and may cause plastic clamping elements at the lower edge region 26 of the plastic structure to melt, so that generally no plastic clamping elements are used on the lower edge 26, but rather the clamping elements 1, described above, of spring steel, which are heat-resistant. At the upper edge region 27, on the other hand, the effects of the thermal radiation and thermal convection by the turbocharger 32 are distinctly less, so that here a heat deflector plate 25 can still be held by means of plastic clamping elements 41.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A fastening arrangement of a heat deflector plate on a plastic structure, comprising:
    an edge region of the plastic structure, which is exposed to a thermal radiation and thermal convection of a heat source;
    an edge region of the heat deflector plate congruent to the edge region of the plastic structure, which has a sound- and heat insulating lamination,
    wherein in the edge region of the heat deflector plate and in the edge region of the plastic structure heat-resistant clamping elements are arranged, which press the edge regions of plastic structure and heat deflector plate onto one another with the sound- and heat insulation lamination arranged therebetween; and
    wherein the clamping elements further comprise claw tips, and the claw tips of the clamping elements, both in the edge region of the heat deflector plate and also in the edge region of the plastic structure, form notches in a compressed state of the two edge regions such that the clamping elements can only be dismantled by means of a spreading tool.

2. The fastening arrangement according to claim 1, wherein the plastic structure has a lower edge region, which is exposed to the thermal radiation and the thermal convection of the heat source and has spring steel clamping elements for fixing the lower edge region of the heat deflector plate with the lower edge region of the plastic structure.

3. A fastening arrangement of a heat deflector plate on a plastic structure, comprising:
- an edge region of the plastic structure, which is exposed to a thermal radiation and thermal convection of a heat source;
- an edge region of the heat deflector plate congruent to the edge region of the plastic structure, which has a sound and heat insulating lamination, and
- wherein in the edge region of the heat deflector plate and in the edge region of the plastic structure heat-resistant clamping elements are arranged, which press the edge regions of plastic structure and heat deflector plate onto one another with the sound and heat insulation lamination arranged therebetween,
- wherein the plastic structure has a plastic panel on an upper crossmember of a vehicle body beneath a windshield and above a turbocharger of an internal combustion engine.

\* \* \* \* \*